United States Patent
Wei et al.

(10) Patent No.: US 10,638,373 B2
(45) Date of Patent: Apr. 28, 2020

(54) STATE TRANSITION METHOD OF WIRELESS COMMUNICATION SYSTEM

(71) Applicant: FG Innovation Company Limited, Tuen Mun (CN)

(72) Inventors: Chia-Hung Wei, Hsinchu (TW); Chie-Ming Chou, Hsinchu (TW); Yung-Lan Tseng, Hsinchu (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 15/849,808

(22) Filed: Dec. 21, 2017

(65) Prior Publication Data

US 2018/0176834 A1    Jun. 21, 2018

Related U.S. Application Data

(60) Provisional application No. 62/437,200, filed on Dec. 21, 2016.

(51) Int. Cl.
*H04W 36/00* (2009.01)
*H04W 76/27* (2018.01)

(52) U.S. Cl.
CPC ... *H04W 36/0016* (2013.01); *H04W 36/0066* (2013.01); *H04W 36/0072* (2013.01); *H04W 76/27* (2018.02); *Y02D 70/00* (2018.01); *Y02D 70/10* (2018.01); *Y02D 70/12* (2018.01); *Y02D 70/126* (2018.01); *Y02D 70/1242* (2018.01); *Y02D 70/1262* (2018.01); *Y02D 70/1264* (2018.01)

(58) Field of Classification Search
CPC ..... H04W 76/27; H04W 24/10; H04W 36/30; H04W 36/0016; H04W 36/0072
See application file for complete search history.

(56) References Cited

U.S. PATENT DOCUMENTS

| | | | |
|---|---|---|---|
| 2013/0028069 A1 | 1/2013 | Pelletier et al. | |
| 2013/0029651 A1 | 1/2013 | Martin et al. | |
| 2018/0132282 A1* | 5/2018 | Ly | H04W 74/0833 |
| 2018/0146402 A1* | 5/2018 | Seo | H04W 36/0088 |

FOREIGN PATENT DOCUMENTS

| | | |
|---|---|---|
| CN | 101635949 A | 1/2010 |
| WO | 2014163372 A1 | 10/2014 |

* cited by examiner

*Primary Examiner* — George Eng
*Assistant Examiner* — Umair Ahsan
(74) *Attorney, Agent, or Firm* — ScienBiziP, P.C.

(57) ABSTRACT

A state transition method of a wireless communication system is provided. A network transition request is transmitted by a wireless electronic device to a first base station of a first network. The network transition request includes an assistance information of the wireless communication device. A handover request including the assistance information is transmitted by the first base station to a second base station of a second network. A handover message is generated and transmitted by the second base station to the first base station in response to the handover request. A state transition message is generated and transmitted by the first base station to the wireless communication device in response to the handover message. The wireless communication device transitions from an RRC inactive state of the first network to a first state of the second network in response to the state transition message.

13 Claims, 12 Drawing Sheets

STATE TRANSITION METHOD OF WIRELESS COMMUNICATION SYSTEM

CROSS REFERENCE

This application claims the benefit of U.S. Provisional Application Ser. No. 62/437,200, filed on Dec. 21, 2016, and entitled "USER EQUIPMENT RRC STATE TRANSITION PROCEDURE IN NEW RADIO", which is incorporated herein by reference in its entirety.

TECHNICAL FIELD

The present disclosure generally relates to state transition methods, and more particularly, to radio resource control (RRC) state transition methods for handling small data transmission in a wireless communication system having a 4th Generation (4G) wireless network and a new wireless network.

BACKGROUND

The 3$^{rd}$ Generation Partnership Project (3GPP) is developing protocols for the next generation wireless communication networks (e.g., new radio (NR)). Under the NR, user equipment (UE) is expected to execute applications which perform infrequent small data transmission and/or reception. It is desirable to perform such infrequent small data transmission and/or reception in a power efficient manner. For example, the UE should avoid undergoing radio resource control (RRC) state transition (e.g., from an RRC IDLE state to an RRC CONNECTED state), when the UE only needs to transmit or receive small data.

FIG. 1A shows an RRC state transition diagram under a 4G wireless network, such as long term evolution (LTE), or LTE-Advanced (LTE-A). In an RRC state transition diagram 100, an RRC layer has two states: an RRC CONNECTED state 192 and an RRC IDLE state 194. In FIG. 1A, the RRC state can transition or switch between the RRC CONNECTED state 192 and the RRC IDLE state 194 by using an RRC connection procedure 193 and an RRC release procedure 195.

With reference to FIG. 1B, in the RRC connection procedure 193, an UE 102 in the RRC IDLE state 194 may send an RRC Connection Request message to an evolved UMTS terrestrial radio access network (E-UTRAN) 112, for example, under 4G LTE standard. The RRC Connection Request message is used to request the establishment of an RRC connection. The E-UTRAN 112 may send an RRC Connection Setup message to the UE 102. Upon receiving the RRC Connection Setup message, the UE 102 transitions from the RRC IDLE state 194 to the RRC CONNECTED state 192, and sends an RRC Connection Setup Complete message to the E-UTRAN 112.

With reference to FIG. 1C, in the RRC release procedure 195, the UE 102 in the RRC CONNECTED state 192 may transition to the RRC IDLE state 194 by receiving an RRC Connection Release message from the E-UTRAN 112. For example, the RRC Connection Release message is used to command the release of the RRC connection.

In the 4G wireless network (e.g., LTE, or LTE-A), User Plane (UP) data can be exchanged only in the RRC CONNECTED state 192. Once the UE 102 is in the RRC IDLE state 194, if the UE 102 needs to transmit or receive UP data, the UE must transition to the RRC CONNECTED state 192 regardless of how small the data size is. Moreover, even before the RRC connection procedure 193, there is still a random access procedure that needs to be performed by the UE 102. Thus, if the UE 102 performs the RRC state transition only for small data transmission and/or reception, the latency is high, and the radio resource and power consumption are also high.

In order to reduce latency and power consumption and efficiently allocate radio resources, a new RRC state has been introduced in the NR. The new RRC state is named an RRC INACTIVE state. As shown in FIG. 2, an RRC state transition diagram 200 under the NR includes three states: an RRC CONNECTED state 282, an RRC IDLE state 284, and an RRC INACTIVE state 286. As shown in FIG. 2, the RRC state can transition or switch among the RRC CONNECTED state 282, the RRC IDLE state 284, and the RRC INACTIVE state 286 through various procedures (e.g., procedures a, b, c, d and e). It should be noted that, in RRC state transition diagram 200, a UE in the RRC IDLE state 284 cannot directly transition or switch to the RRC INACTIVE state 286, as has been agreed by the current 3GPP standardization community. Instead, the UE needs to transition to the RRC CONNECTED state 282 through procedure b, then to the RRC INACTIVE state 286 through procedure c.

Different from the 4G wireless network (e.g., LTE, or LTE-A), a UE in the RRC INACTIVE state should incur minimum signalling, minimal power consumption, minimal radio resource costs in the NR, making it possible to maximize the number of UEs utilizing (and benefiting from) this new RRC state. Another key advantage of having the RRC INACTIVE state is that the UE is able to start data transfer with very low delay. For example, the UE may start transmitting or receiving data directly while in the RRC INACTIVE state.

According to the current 3GPP standardization works, after the RRC INACTIVE state is introduced, there have been various discussions on RRC state transitions and related procedures, the UE's mobility is also another aspect that needs to be considered with the RRC state transitions (e.g., procedures c, d and e shown in FIG. 2). For example, since the RRC INACTIVE state is transparent to a core network (CN), the paging procedure while the UE is in the RRC INACTIVE state needs to be performed as RAN-based. It means that once there is a need for the CN to transmit downlink data to the UE, the serving next generation node Bs (gNBs) within a notification area (NA) may transmit the paging messages using notification-based paging, as opposed to by other gNBs or by evolved node Bs (eNBs) within the same tracking area (TA) according to the 4G wireless network based paging procedure (e.g., TA-based paging). The NA under NR is managed by the RAN (Radio Access Network), whereas the TA under 4G wireless network is managed by the CN. In addition, the size of NA will be smaller than the size of TA. Under the RAN-based paging architecture, there is a risk that when the UE, while in the RRC INACTIVE state, leaves a gNB coverage area of the serving gNB and moves to a coverage area of a 4G wireless network (e.g., LTE, or LTE-A) base station (e.g., an eNB).

Thus, there is a need in the art for methods to handle user equipment (UE) RRC state transitions as the UE moves from a NR' coverage area to a 4G wireless network coverage area.

SUMMARY

In one aspect of the present disclosure, a state transition method of a wireless communication system is provided. A network transition request is transmitted by a wireless electronic device to a first base station of a first network. The network transition request includes an assistance information of the wireless communication device. A handover request including the assistance information is transmitted by the first base station of the first network to a second base station of a second network. A handover message is generated and transmitted by the second base station to the first base station in response to the handover request. A state transition message is generated and transmitted by the first base station to the wireless communication device in response to the handover message. The wireless communication device transitions from an RRC inactive state of the first network to a first state of the second network in response to the state transition message.

In another aspect of the present disclosure, a wireless communication system provided. The wireless communication system includes a first base station connected to a first network, a second base station connected to a second network, and a wireless communication device. The wireless communication device is configured to transmit a network transition request to the first base station. The network transition request includes an assistance information of the wireless communication device. The first base station is configured to transmit a handover request including the assistance information to the second base station. The second base station is configured to generate and transmit a handover message to the first base station in response to the handover request. The first base station is further configured to generate and transmit a state transition message to the wireless communication device in response to the handover message. The wireless communication device is further configured to transition from an RRC inactive state of the first network to a first state of the second network in response to the state transition message.

In yet another aspect of the present disclosure, a wireless communication device is provided. The wireless communication device includes a processor configured to perform the followings instructions. A network transition request is transmitted to a first base station of a first network. The network transition request includes an assistance information of the wireless communication device. A state transition message is received from the first base station. The state transition message is generated by the first base station in response to a handover message received from a second base station of a second network. The processor is configured to transition from an RRC inactive state of a first network to a first state of a second network.

In yet another aspect of the present disclosure, a base station is provided. The base station includes a processor configured to perform the followings instructions. A network transition request is received from the wireless communication device. The network transition request includes an assistance information of the wireless communication device. A handover request including the assistance information is transmitted to a second base station of a second network. A handover message is received from the second base station. The handover message is generated by the second base station in response to the handover request. A state transition message is generated and transmitted to the wireless communication device in response to the handover message. The wireless communication device transitions from an RRC inactive state of the first network to a first state of the second network when the wireless communication device receives the state transition message.

BRIEF DESCRIPTION OF THE DRAWINGS

Implementations of the present technology will now be described, by way of example only, with reference to the attached figures, wherein.

DETAILED DESCRIPTION

Figure 1A:
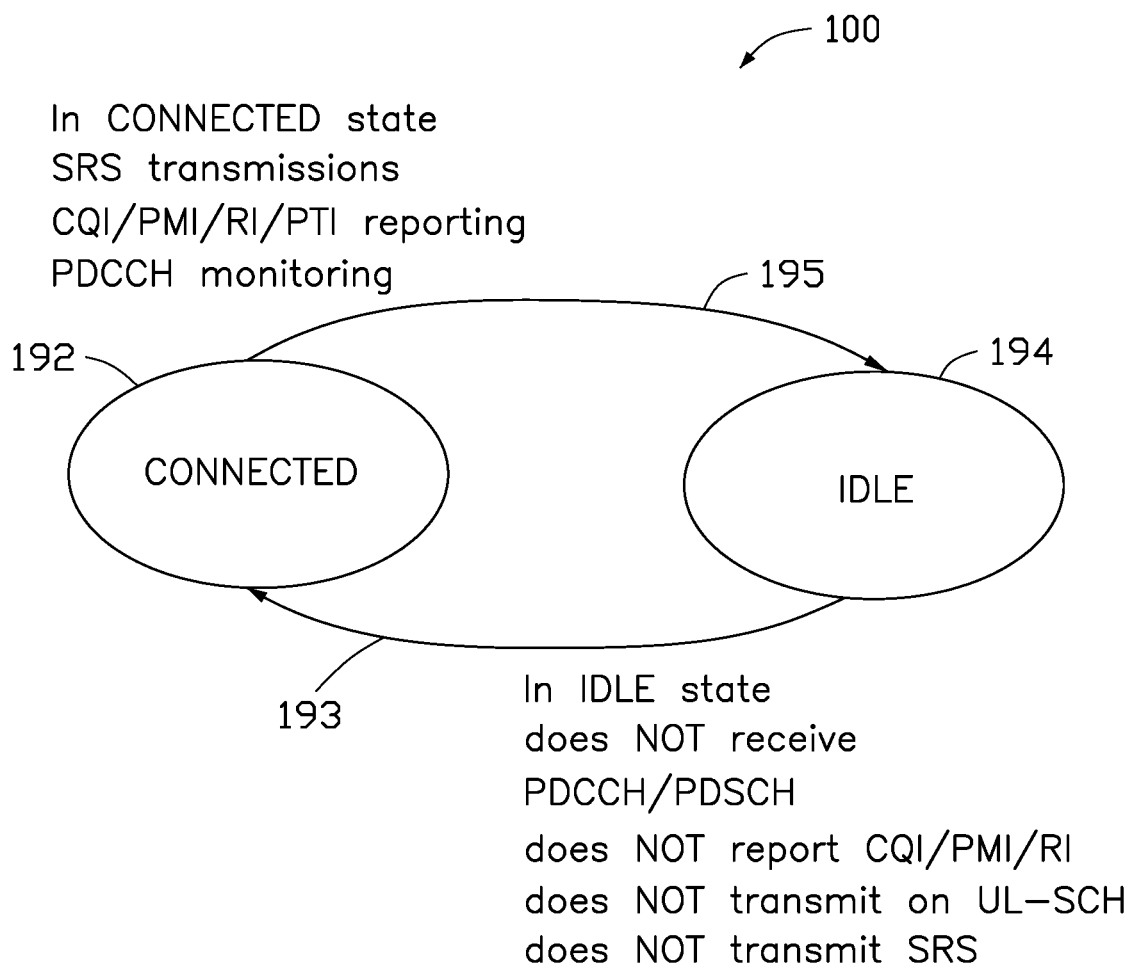
FIG. 1A is an RRC state transition diagram under a 4G wireless network, according to an exemplary embodiment of the present disclosure.
Figure 1B:
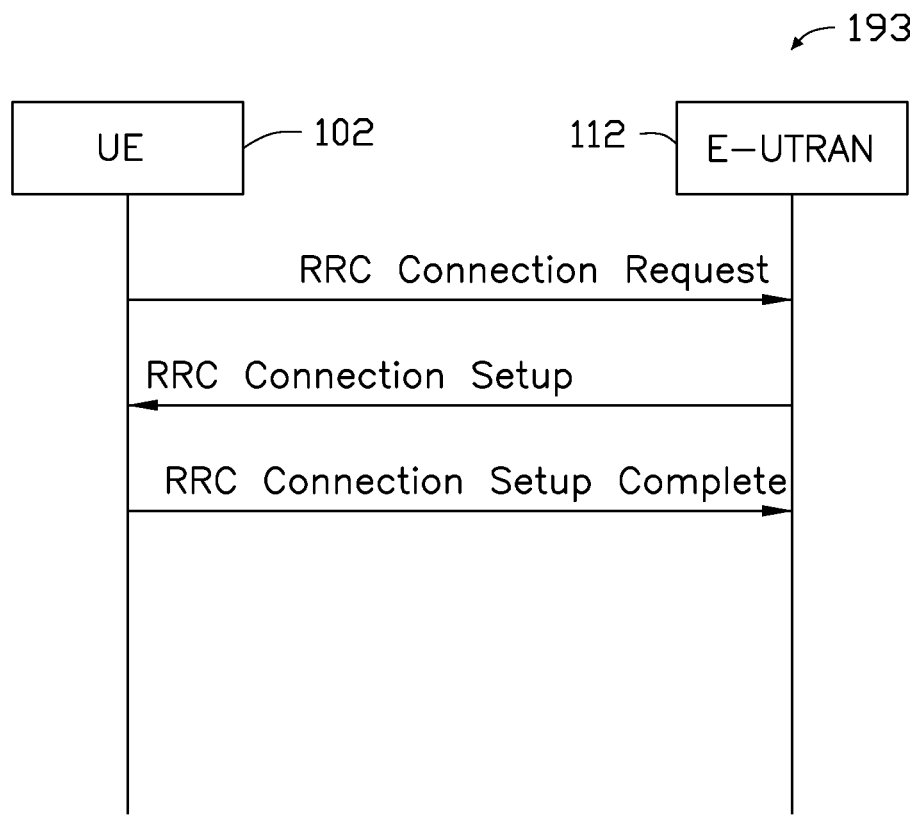
FIG. 1B is a diagram showing an RRC connection procedure, according to an exemplary embodiment of the present disclosure.
Figure 1C:
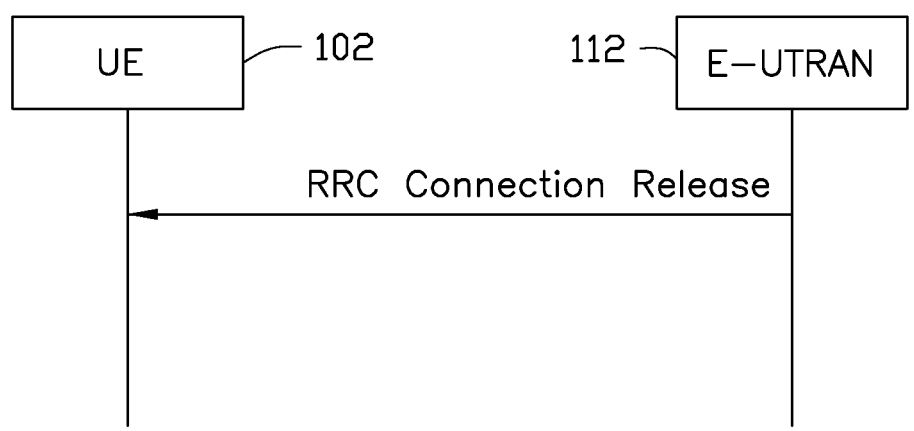
FIG. 1C is a diagram showing an RRC release procedure, according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Figure 3:
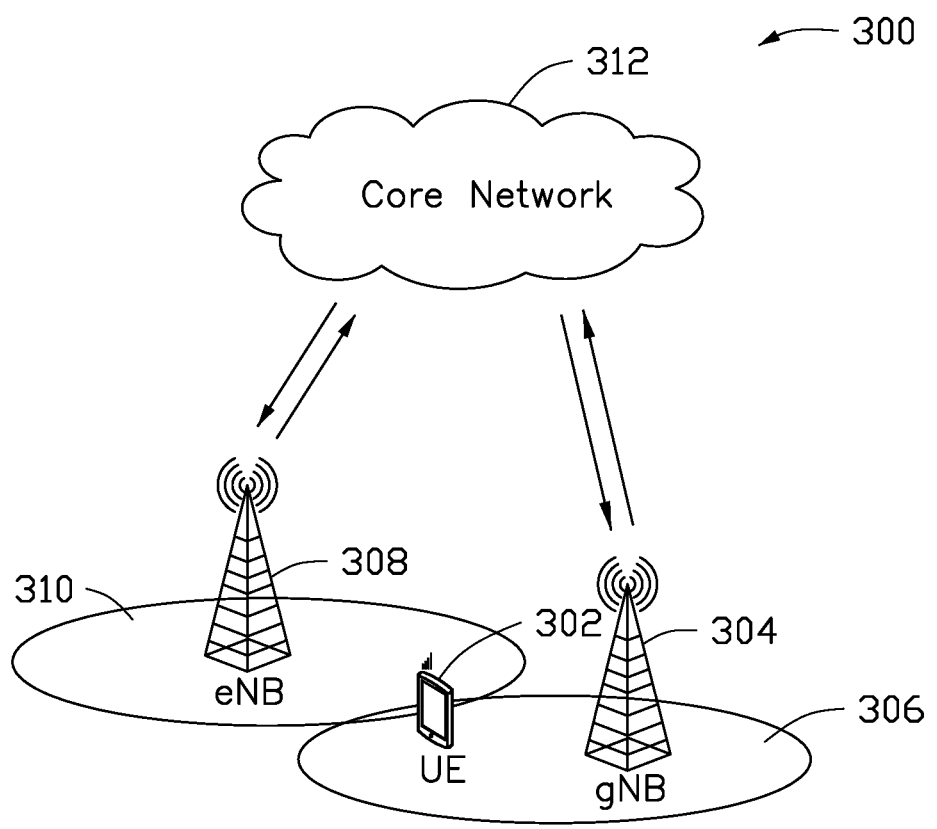
FIG. 3 shows a schematic diagram of a wireless communication system of an exemplary embodiment of the present disclosure.

FIG. 3 shows a schematic diagram of a wireless communication system including a first network and a second network, according to an exemplary embodiment of the present application. As shown in FIG. 3, a wireless communication system 300 includes a wireless communication device 302, a first base station 304 of the first network, and a second base station 308 of the second network. In this exemplary embodiment, the wireless communication device 302 is a user equipment (UE). The first network is a NR, and the first base station 304 is a serving gNB of the UE 302. The second network is a 4G wireless network, and the second base station 308 is a target eNB near UE 302. The serving gNB 304 has a gNB coverage area 306 under a 3GPP NR access network. The target eNB 308 has an eNB coverage area 310 under a LTE wireless network. The wireless communication system 300 further includes a core network (CN) 312 respectively in communicating with the serving gNB 304 and the target eNB 308. When the UE 302 is in the RRC INACTIVE state, the RAN-based paging will fail, as the UE 302 is moving from the gNB coverage area 306 of the serving gNB 304 to the eNB coverage area 310 of the target eNB 308. In addition, the serving gNB 304 does not have the knowledge that the UE 302 is leaving or has left its gNB coverage area 306.

Figure 4:
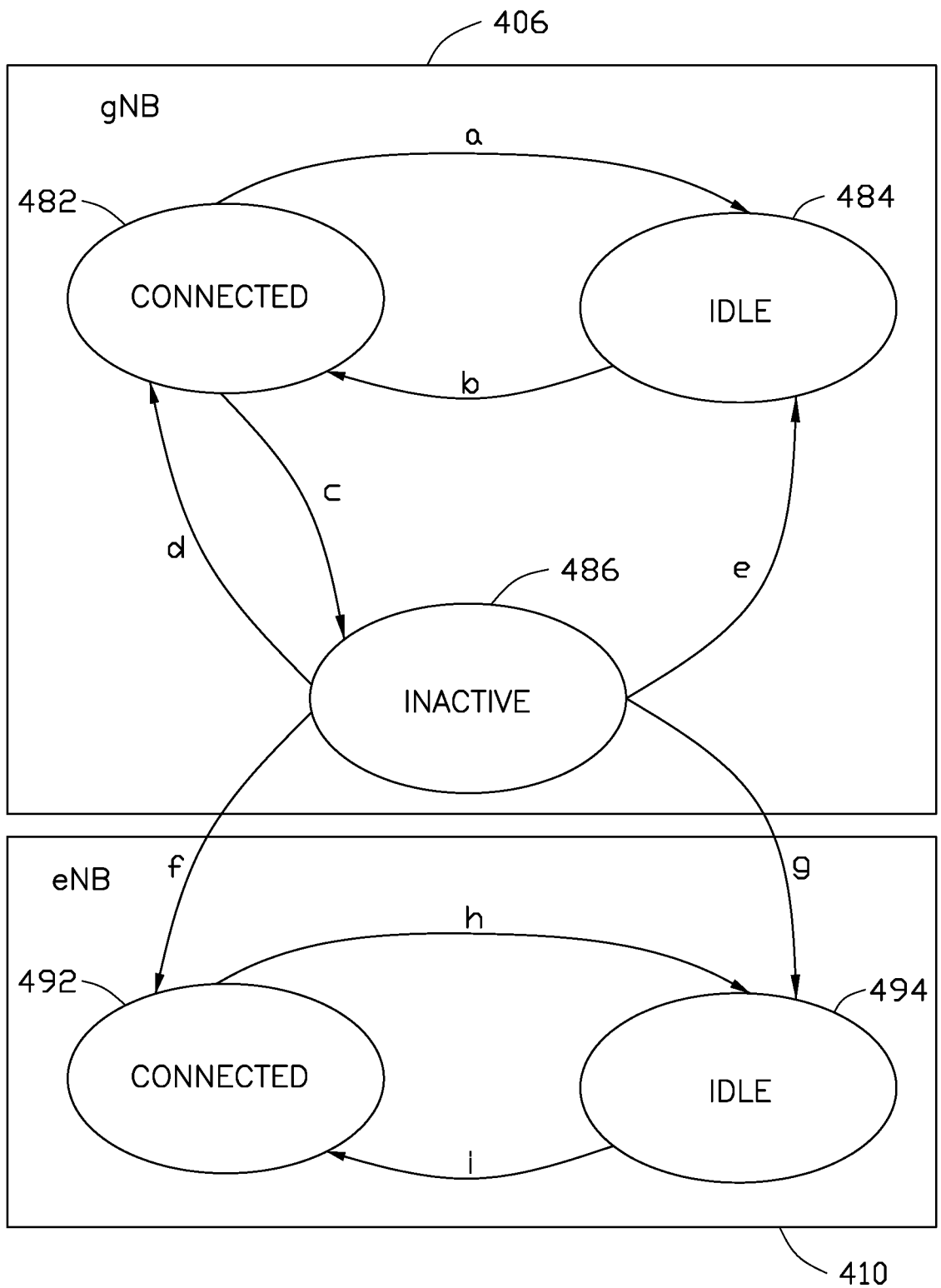
FIG. 4 is an RRC state transition diagram under a 4G wireless network and a NR, according to an exemplary embodiment of the present disclosure.

The possible RRC state transitions of the UE 302 as it moves from the gNB coverage area 306 to the eNB coverage area 310 is shown with reference to FIG. 4. FIG. 4 illustrates an RRC state transition diagram under a 4G wireless network and a NR, according to an exemplary embodiment of the present disclosure. In FIG. 4, an RRC state transition diagram 400 includes various RRC state transition procedures that user equipment may undergo within a gNB coverage area 406 of a serving gNB (e.g., the serving gNB 304 in FIG. 3), within an eNB coverage area 410 of a target eNB (e.g., the target eNB 308 in FIG. 3), and from the gNB coverage area 406 to the eNB coverage area 410.

Figure 2:
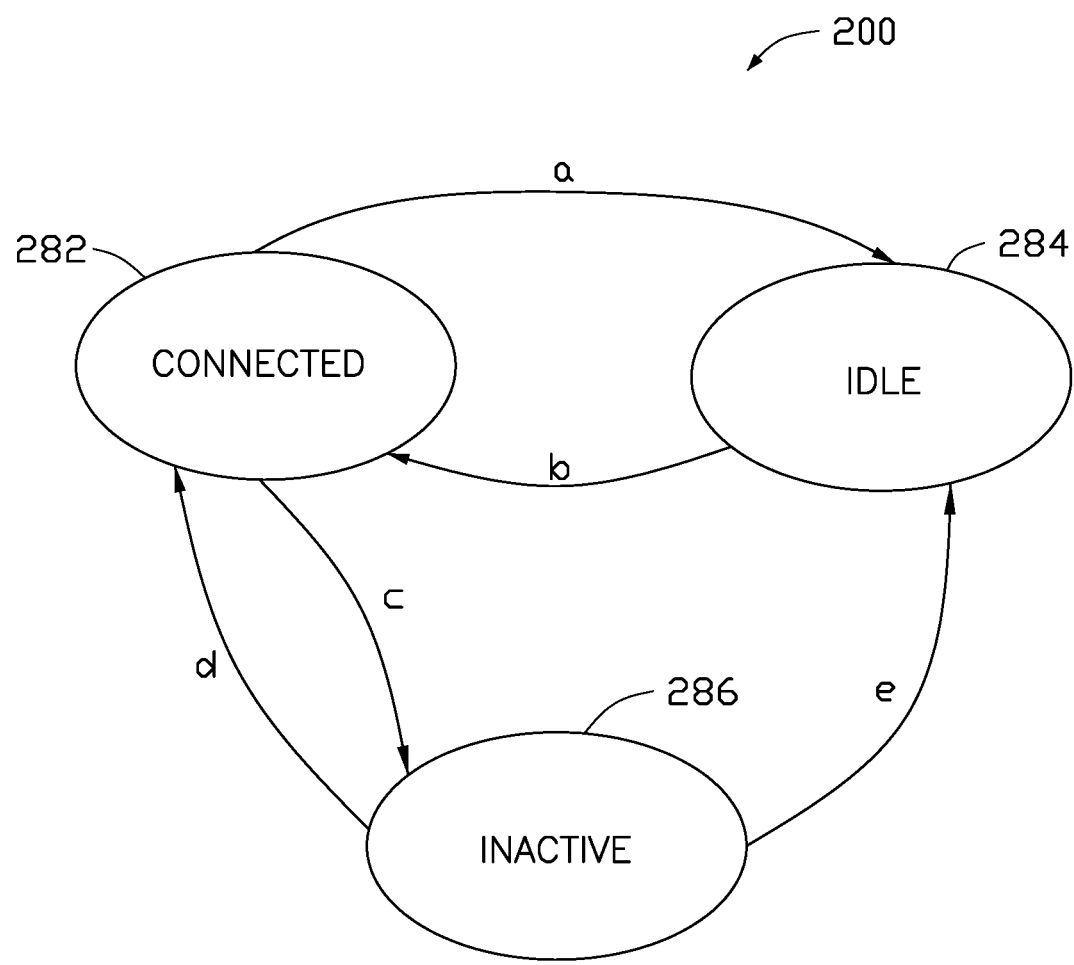
FIG. 2 is an RRC state transition diagram under a NR, according to an exemplary embodiment of the present disclosure.

It is noted that, different from FIG. 2, when the UE enters the eNB coverage area 410 from the gNB coverage area 406, the UE needs to leave the RRC INACTIVE state 486 and transition to either the RRC CONNECTED state 492 or the RRC IDLE state 494. For example, while the UE is in the gNB coverage area 406, the UE may transition among an RRC CONNECTED state 482, an RRC IDLE state 484, and the RRC INACTIVE state 486 through various procedures (e.g., procedure a, b, c, d, and e). Also, while the UE is in the eNB coverage area 410, the UE may transition between the RRC CONNECTED state 492 and the RRC IDLE state 494 through various procedures (e.g., procedures h and i). Furthermore, as the UE moves from the gNB coverage area 406 to the eNB coverage area 410, assuming that the UE is in the RRC INACTIVE state 486 before leaving the serving gNB, the UE may either transition to the RRC IDLE state 494 through procedure g, or transition to the RRC CONNECTED state 492 through procedure f. It is noted that, the UE may also transition from the RRC INACTIVE state 486 to the RRC IDLE state 494 by first transitioning to the RRC CONNECTED state 492 through procedure f, and then transitioning from the RRC CONNECTED state 492 to the RRC IDLE state 494 through procedure h.

Figure 5:
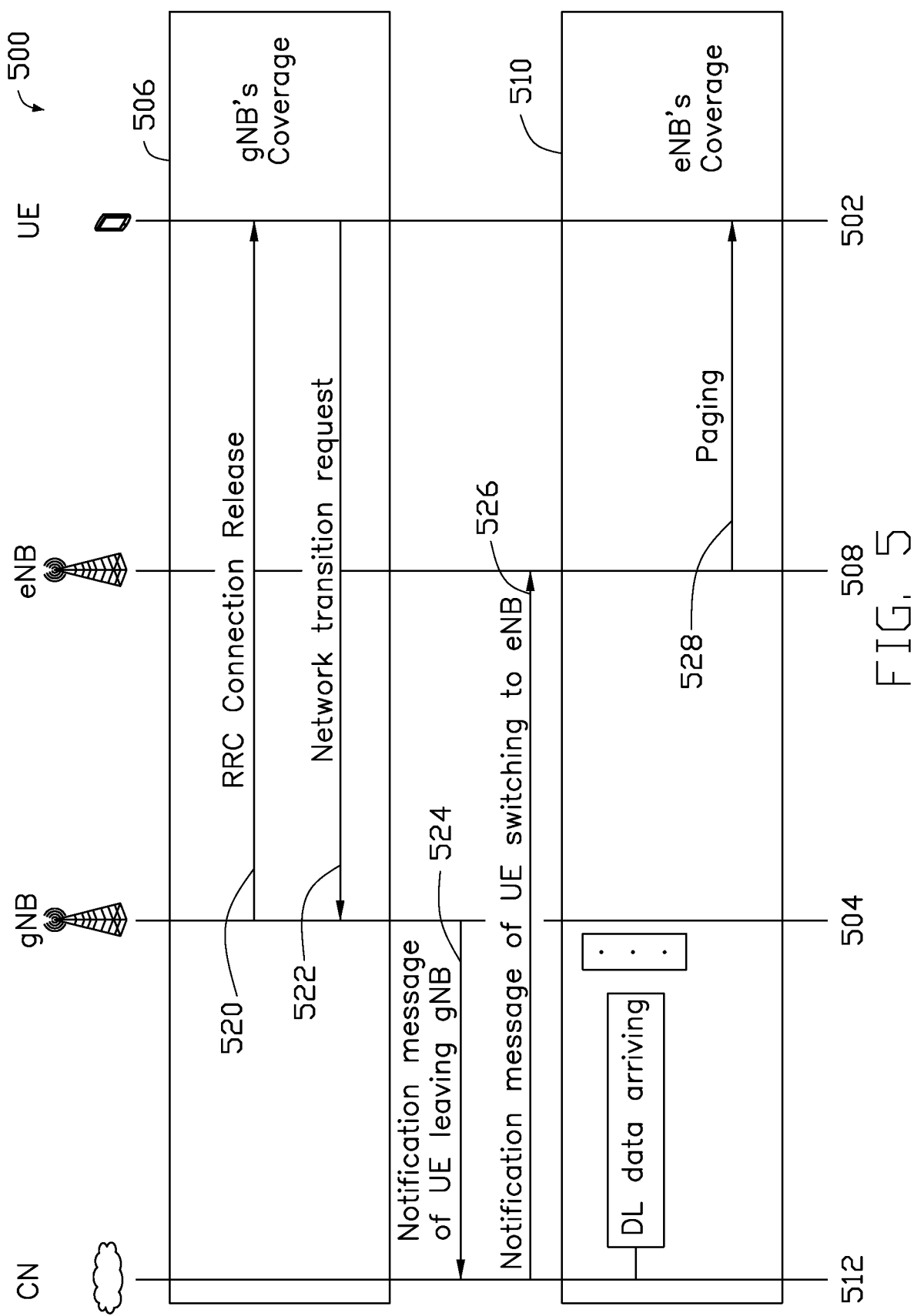
FIG. 5 is a notice based RRC state transition diagram, according to an exemplary embodiment of the present disclosure.

In FIG. 5, a notice based RRC state transition diagram 500 shows a UE transitions directly from an RRC INACTIVE state supported by a NR to an RRC IDLE state supported by a 4G wireless network. In one exemplary embodiment, the notice based RRC state transition diagram 500 describes the RRC state transition procedure g in FIG. 4, where the RRC INACTIVE state 486 under the gNB coverage area 406 transitions directly to the RRC IDLE state 494 under the eNB coverage area 410. In the notice based RRC state transition diagram 500, the notice based state transition includes steps 520, 522, 524, 526, and 528.

In step 520, a UE 502 in a gNB coverage area 506 is suspended to the RRC INACTIVE state by a serving gNB 504 through an RRC Connection Release message, which contains a resume ID.

In step 522, the UE 502 sends a network transition request to the serving gNB 504 to notify that the UE 502 is leaving the serving gNB 504. In this exemplary embodiment, the network transition request is an RRC Connection Resume message, which contains the resume ID. In some embodiments, the network transition request includes an indicator which indicates the UE 502 transitions to the RRC IDLE state, enters 4G wireless network (e.g., LTE coverage), and/or transitions to 4G wireless network's RRC states. In another exemplary embodiment, in step 522, the RRC Connection Resume message may include a tracking area (TA) code or a cell ID.

For example, the UE 502 may use the RRC Connection Resume message to notify the serving gNB 504 that the UE is leaving the gNB coverage area 506, when the UE 502 determines that the radio link quality between itself and the serving gNB 504 is getting poor and/or satisfies one or more predefined conditions. For example, one predefined condition may be a reference signal measurement result(s) being lower than a threshold value(s). In addition, in order to avoid ping-pong effect, the threshold value may include an offset for comparison. Also, the reference signal measurement result(s) needs to be lower than the threshold value(s) for a predetermined time period. Other predefined conditions may include a neighboring eNB's signal is stronger than serving gNB's signal by a predetermined threshold for a predetermined period of time. Then, the UE 502 may transition to the RRC IDLE state in the eNB coverage area 510 directly from the RRC INACTIVE state in the gNB coverage area 506. It is noted that Radio Link Failure (RLF) case is not considered in the present exemplary embodiment, since a UE in the RRC INACTIVE state is assumed to indicate RLF (e.g., being forced to transition to the RRC IDLE state and then established connection with another eNB/gNB) when the UE can't identify any available cells while in the RRC INACTIVE state.

In step 524, after the serving gNB 504 receives the network transition request from the UE 502, the serving gNB 504 notifies a core network (CN) 512 by, for example, forwarding the network transition request (e.g., RRC Connection Resume message) to the CN 512. Thus, the CN 512 acquires knowledge that the UE 502 is leaving the gNB coverage area 506. In this exemplary embodiment, when the CN 512 receives the network transition request from the the serving gNB 504, the CN 512 acquires knowledge that the UE 502 transitions directly from the RRC INACTIVE state in the gNB coverage area 506 to the RRC IDLE state in the eNB coverage area 510, thus changing to the 4G wireless network supported RRC states. The network transition request that the UE 502 sent to the CN 512 is to let the CN 512 know that when there is a need to transmit downlink data to the UE 502, the CN 512 may page the UE 502 by TA-based paging procedures (e.g., requesting all of the eNBs/gNBs under the same tracking area to page the UE 502 and then forward the downlink data).

In step 526, the CN 512 may notify a plurality of eNBs, although only the target eNB 508 is shown in FIG. 5, around the serving gNB 504 about the possibility of the UE 502 entering. The CN 512 may also configure proper paging configurations with the plurality of eNBs.

In step 528, when downlink (DL) data needs to be transmitted to the UE 502, the CN 512 may page the UE 502 by TA-based paging procedures using the plurality of eNBs, where at least one of the plurality of eNBs broadcasts the paging message from the CN 512 to the UE 502.

It is noted that in the notice based RRC state transition diagram 500, the UE 502 may not transition to the RRC CONNECTED state, although initially in step 520, the UE 502 sends the RRC Connection Resume message to the serving gNB 504.

Figure 6A:
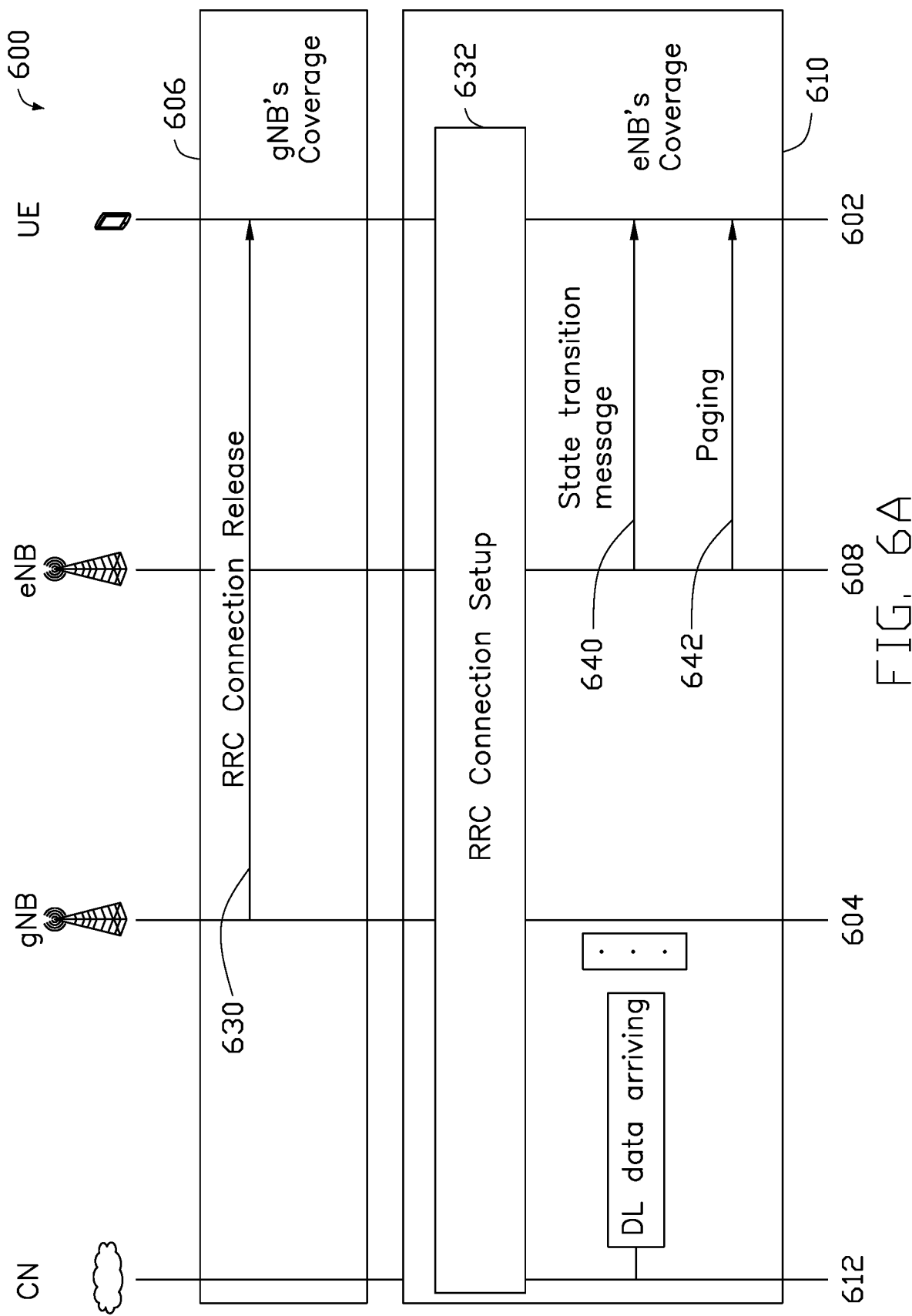
FIG. 6A is a full RRC configuration based state transition diagram, according to an exemplary embodiment of the present disclosure.

In FIG. 6A, a full RRC configuration based state transition diagram 600 shows UE transitions from an RRC INACTIVE state supported by a NR to an RRC IDLE state supported by a 4G wireless network through an RRC CONNECTED state supported by the 4G wireless network. In one exemplary embodiment, the full RRC configuration based state transition diagram 600 describes RRC state transition procedures f and h in FIG. 4, where the RRC INACTIVE state 486 in the gNB coverage area 406 transitions to the RRC CONNECTED state 492 in the eNB coverage area 410, then to the RRC IDLE state 494 in the eNB coverage are 410.

As shown in FIG. 6A, the full RRC configuration based state transition diagram 600 includes steps 630, 632, 640, and 642. In the full RRC configuration based state transition diagram 600, the RRC connection setup is performed directly between UE 602 and a target eNB 608. For example, the network transition request is transmitted by the UE 602 to the target eNB 608. In some embodiments, the network transition request may be an RRC connection request, and include assistance information of the UE 602, such as the purpose of the RRC connection (e.g., for transitioning to the RRC IDLE state or to the RRC CONNECTION state) and/or the service type of the UE 602 (e.g., frequent/infrequent small data transmission) and/or the UE 602's category (e.g., the UE's radio capability, data rate and power class).

Based upon the assistance information of the UE 602 transmitted by the UE 602, the target eNB 608 determines a state transition message the target eNB replies to the UE 602. In one exemplary embodiment, the state transition message is an RRC Connection Setup message for the purpose of keeping the UE 602 in the RRC CONNECTED state under the eNB coverage area 610 (e.g., for small data transmission). In another exemplary embodiment, the state transition message is an RRC Connection Reject message for the purpose of reducing the number of messages needed for transitioning the UE 602 into the RRC IDLE state under the eNB coverage area 610. In yet another exemplary embodiment, the target eNB 608 may first reply an RRC Connection Setup message for the purpose of letting the UE 602 transition to the RRC CONNECTED state having an RRC reconfiguration under the eNB coverage area 610, and then transmit an RRC Connection Release message to the UE 602 for the purpose of letting the UE 602 transition to the RRC IDLE state under the eNB coverage area 610.

In step 630, the UE 602 in a gNB coverage area 606 is suspended to the RRC INACTIVE state by a serving gNB 604 through an RRC Connection Release message, which contains a resume ID.

Figure 6B:
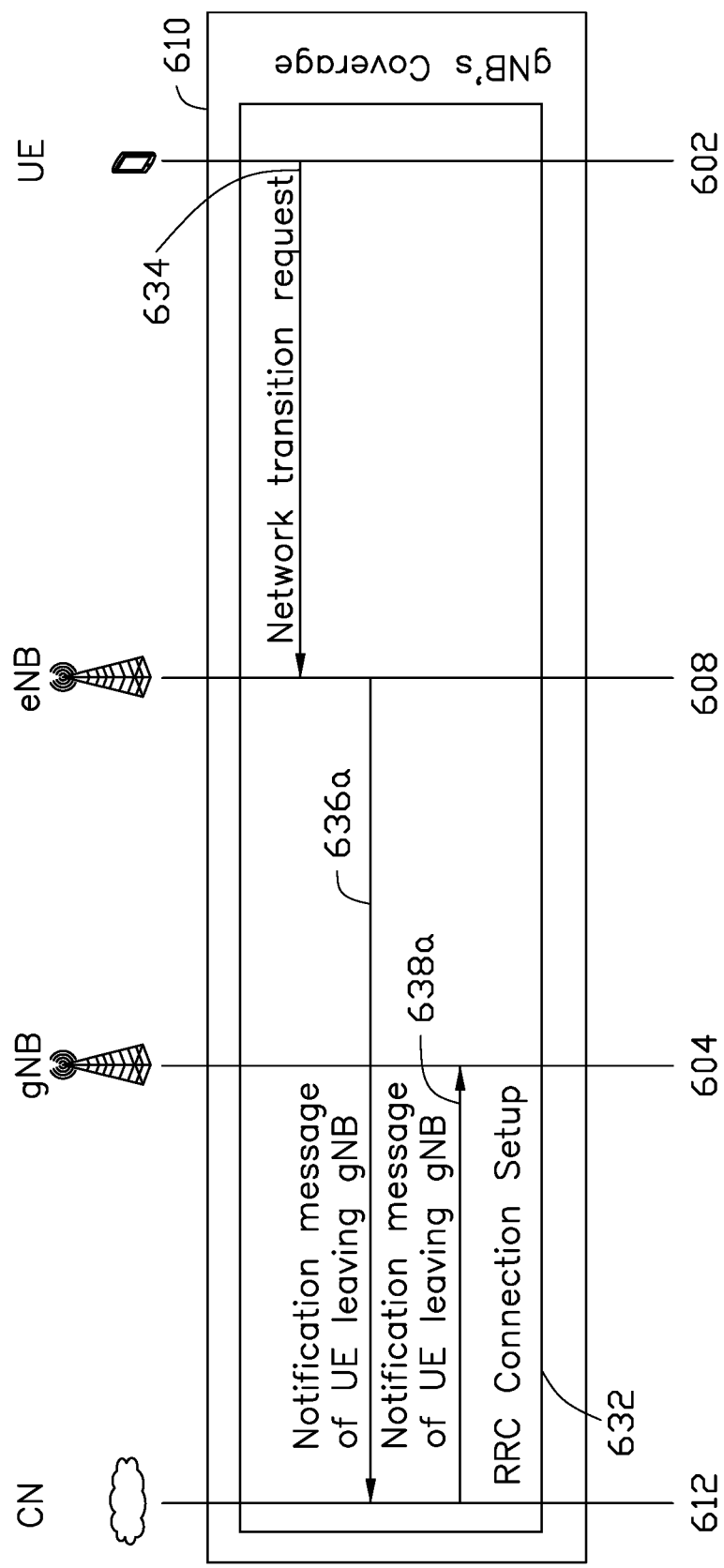
FIG. 6B is an RRC connection setup procedure under a full RRC configuration based state transition diagram, according to an exemplary embodiment of the present disclosure.
Figure 6C:
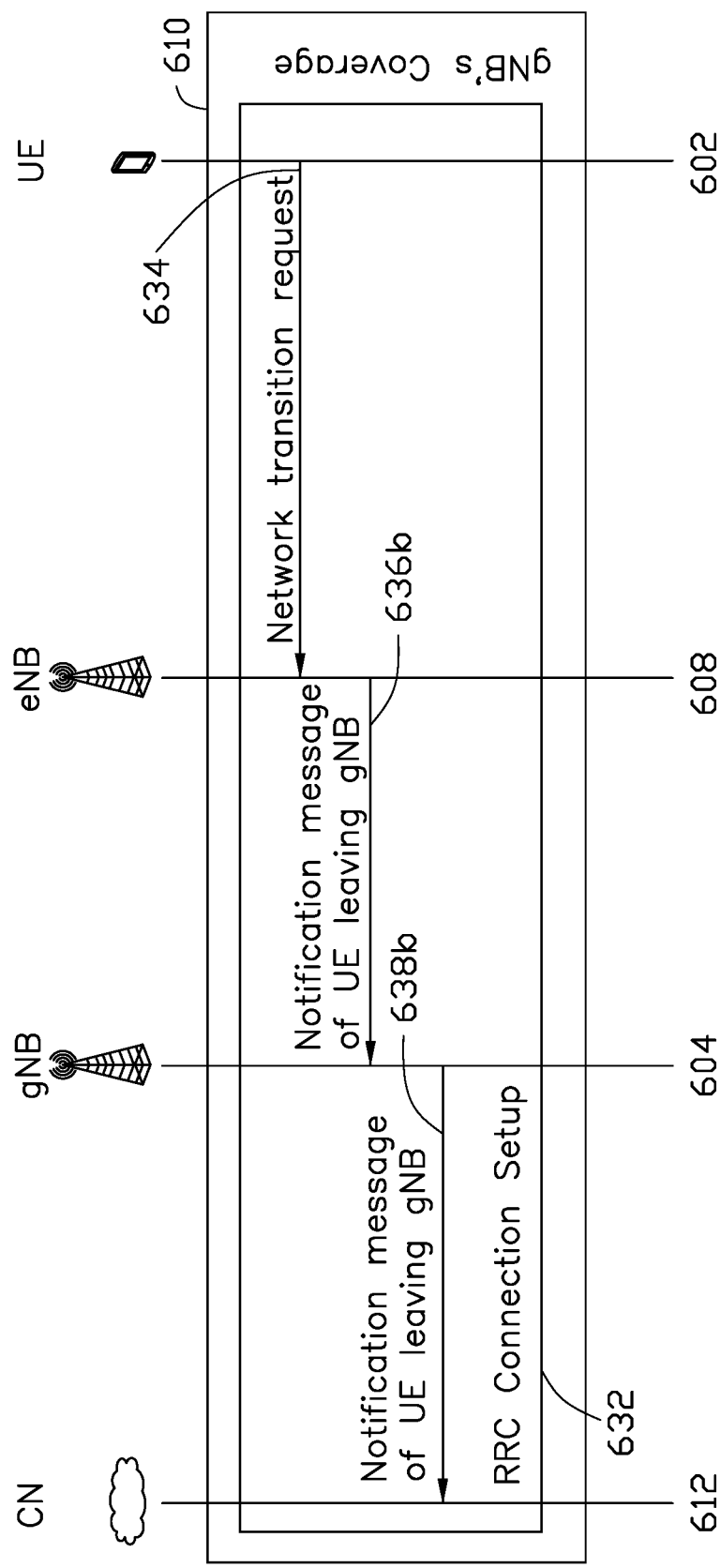
FIG. 6C is an RRC connection setup procedure under a full RRC configuration based state transition diagram, according to an exemplary embodiment of the present disclosure.
Figure 6D:
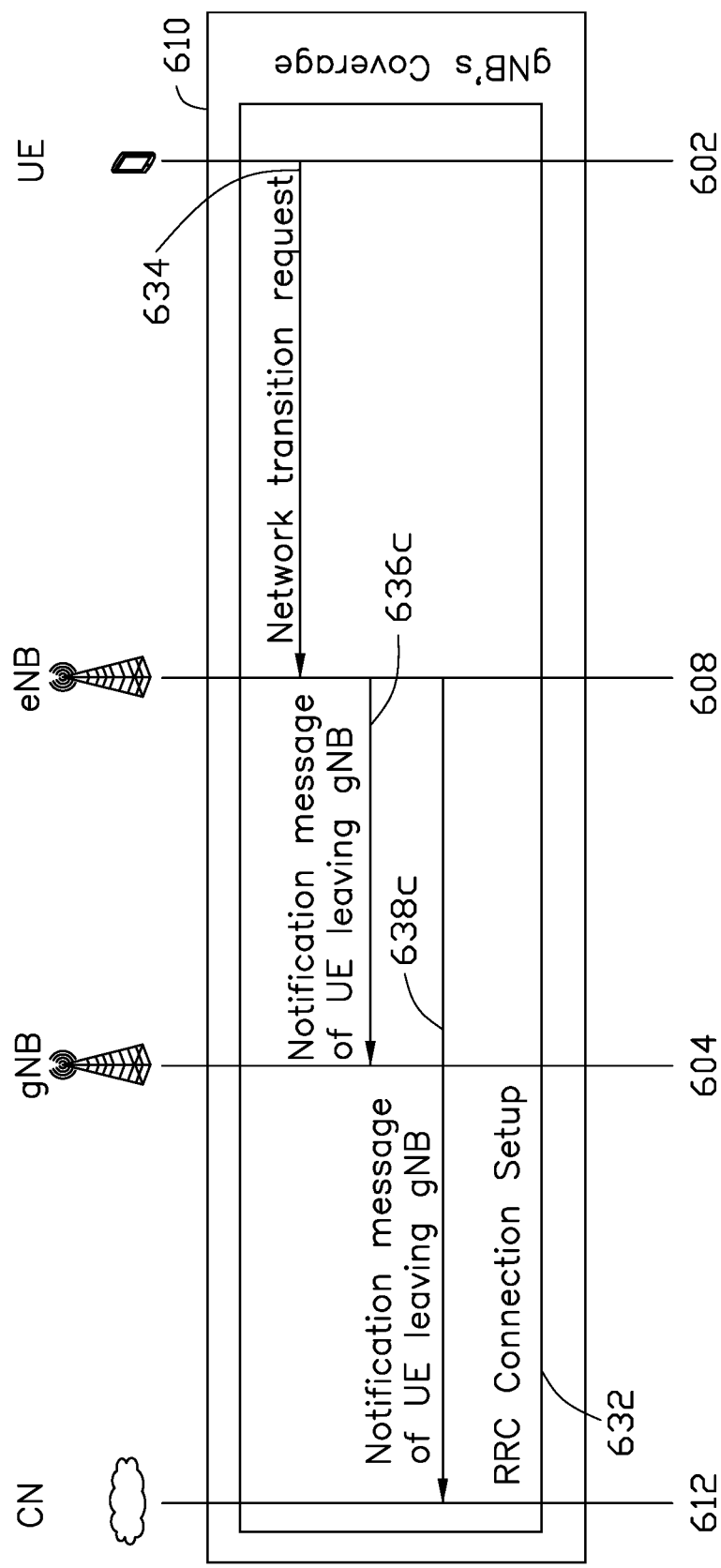
FIG. 6D is an RRC connection setup procedure under a full RRC configuration based state transition diagram, according to an exemplary embodiment of the present disclosure.

In step 632, the UE 602 uses an RRC connection setup procedure to get the full RRC configuration. For example, in step 634 as shown in FIGS. 6B, 6C and 6D, the UE 602 sends a network transition request (e.g., an RRC Connection Request message) directly to the target eNB 608, where the RRC Connection Request message is to request the establishment of an RRC connection. The RRC Connection Request message may include assistance information of the UE 602 to let the target eNB 608 know the purpose of the RRC connection (e.g., for transitioning to the RRC IDLE state or to the RRC CONNECTION state) and/or the service type of the UE 602 (e.g., for frequent small data transmission).

In one exemplary embodiment, as shown in FIG. 6B, after the target eNB 608 receives the RRC Connection Request message from the UE 602 in step 634, the target eNB 608 may notify a core network (CN) 612 that the UE 602 is leaving the gNB coverage area 606 in step 636a. The CN 612 may then notify the serving gNB 604 that the UE 602 is leaving or has left the gNB coverage area 606 in step 638a. Thereafter, the UE 602's context stored in the serving gNB 604 may be removed from the serving gNB 604. Also, the UE 602's context associated with the serving gNB 604 may be removed from the CN 612.

In another exemplary embodiment, as shown in FIG. 6C, after the target eNB 608 receives the RRC Connection Request message from the UE 602 in step 634, the target eNB 608 may notify the serving gNB 604 that the UE 602 is leaving the gNB coverage area 606 in step 636b. The serving gNB 604 may then notify the CN 612 that the UE 602 is leaving the gNB coverage area 606 in step 638b. Thereafter, the UE 602's context stored in the serving gNB 604 may be removed from the serving gNB 604. Also, the UE 602's context associated with the serving gNB 604 may be removed from the CN 612.

In yet another exemplary embodiment, as shown in FIG. 6D, after the target eNB 608 receives the RRC Connection Request message from the UE 602 in step 634, the target eNB 608 may notify the serving gNB 604 and the CN 612, that the UE 602 is leaving the gNB coverage area 606, in steps 636c and 638c, respectively. Thereafter, the UE 602's context stored in the serving gNB 604 may be removed from the serving gNB 604. Also, the UE 602's context associated with the serving gNB 604 may be removed from the CN 612.

It should be noted that in the present exemplary embodiment, the UE 602 sends the RRC Connection Request message directly to the target eNB 608. In another exemplary embodiment, the UE 602 may send an RRC Connection Setup Complete message directly to the target eNB 608 containing substantially the same assistance information of the UE 602 to the target eNB 608. It should be understood that the RRC Connection Setup Complete message may have a larger available size than the RRC Connection Request message.

In step 640, the target eNB 608 sends a state transition message to the UE 602. For example, the target eNB 608 sends an RRC Connection Setup message to the UE 602 to transition the UE 602 from the RRC INACTIVE state under the gNB coverage area 606 to the RRC CONNECTED state under the eNB coverage area 610, or an RRC Connection Reject message to the UE 602 to command the release of the RRC connection (e.g, transition the UE 602 from the RRC INACTIVE state under the gNB coverage area 606 to the RRC IDLE state under the eNB coverage area 610).

In one exemplary embodiment, based upon the assistance information of the UE 602 contained in the RRC Connection Request message received from the UE 602, the target eNB 608 determines whether to transition the UE 602 from the RRC INACTIVE state under the gNB coverage area 606 to either the RRC IDLE state or the RRC CONNECTED state under the eNB coverage area 610. For example, the assistance information of the UE 602 may be at least one of the purpose of the RRC connection and/or the service type of the UE 602. In step 640, the target eNB 608 replies an RRC Connection Setup message for the purpose of keeping the UE 602 in the RRC CONNECTED state under the eNB coverage area 610 for small data transmissions, if the assistance information of the UE 602 in the RRC Connection Request message sent in step 632 indicates that the service type of the UE 602 is for frequent small data transmission. Alternatively, the target eNB 608 replies an RRC Connection Reject message to the UE 602 for the purpose of transitioning the UE 602 to the RRC IDLE state under the eNB coverage area 610, if the assistance information of the UE 602 in the RRC Connection Request message sent in step 632 indicates that the service type of the UE 802 is for infrequent small data transmission.

In another exemplary embodiment, the assistance information of the UE 602 may contain a preferred RRC state from the UE 602. The target eNB 608 may determine whether to transition the UE 602 from the RRC INACTIVE state to either the RRC IDLE state or the RRC CONNECTED state based upon of the preferred RRC state from the UE 602 (e.g., by honoring the preferred RRC state). For example, in step 640, the target eNB 608 replies an RRC Connection Setup message for the purpose of keeping the UE 602 in the RRC CONNECTED state under the eNB coverage area 610, when the assistance information of the UE 602 (in the RRC Connection Request message sent in step 634) indicates the preferred RRC state is the RRC CONNECTED state in the RRC Connection Request message sent in step 632. Alternatively, the target eNB 608 replies an RRC Connection Reject message to the UE 602 for the purpose of transitioning the UE 602 to the RRC IDLE state under the eNB coverage area 610, when the assistance information of the UE 602 (in the RRC Connection Request message sent in step 634) indicates the preferred RRC state is the RRC IDLE state.

In yet another exemplary embodiment, the assistance information of the UE 602 may include the UE 602's radio capability, data rate and power class. The target eNB 608 determines whether to transition the UE 602 from the RRC INACTIVE state under the gNB coverage area 606 to either the RRC IDLE state or the RRC CONNECTED state under the eNB coverage area 610 based upon at least one of the UE 602's radio capability, data rate and power class.

In should be noted that, in responding to the UE 602, the target eNB 608 may include a Light Connection indication in the RRC Connection Setup message, the RRC Connection Release message, or the RRC Connection Reject message. The Light Connection indication is to configure the UE 602 to transition to a Light Connection operation mode, which may be a sub-state under either the RRC IDLE or RRC CONNECTED state under the eNB coverage area 610. It is noted that the LTE Light Connection is described in LTE Rel. 14, where the LTE Light Connection is regarded as an operation mode in the RRC CONNECTED state and RRC IDLE state for 4G LTE networks.

The target eNB 608 may configure the UE 602 to enter into the Light Connection operation mode by RRC signaling. Then, the radio bearers between the target eNB 608 and the UE 602, which include signaling radio bearer (SRB) and data radio bearer (DRB), are temporarily released. The target eNB 608 and the UE 602 still store the UE 602's context. At least one of the target eNB 608 and the UE 602 may store the SRB and DRB configurations. As a result, the target eNB 608 and the UE 602 may restore all the configurations quickly when they want to restart the radio bearers between them. The target eNB 608 may keep the S1 connection of the UE 602 with the CN 612, so that the UE 602 does not need to reestablish the core network connection, for example, if it is in the RRC IDLE state. The UE 602 may perform the same cell reselection based mobility as in the RRC IDLE state, when the UE 602 enters the Light Connection operation mode. The UE 602 may resume to be fully connected to the target eNB 608 when the UE 602 is paged (via RAN initiated paging) or when any MO-data/signaling is initiated. By contrast, a UE in the RRC IDLE state can only be paged by the CN.

Thus, among other advantages, when the UE 602 enters the Light Connection operation mode based upon the Light Connection indication sent from the target eNB 608, the UE 602 may reduce its power consumption because the UE 602's RAN behavior is the same as an UE in the RRC IDLE state. Furthermore, the UE 602 in the Light Connection operation mode can restart the radio bearers in an efficient way because both the target eNB 608 and UE 602 still store the UE's context. Thus, the radio and network interface signaling overhead can be substantially reduced. In addition, the UE access latency can also be substantially reduced.

In step 642, the CN 612 may configure the proper paging configurations with the target eNB 608. When downlink data needs to be transmitted to the UE 602, the CN 612 may page the UE 602 by TA-based paging procedures using the target eNB 608, which broadcasts the paging message from the CN 612 to the UE 602.

Figure 7:
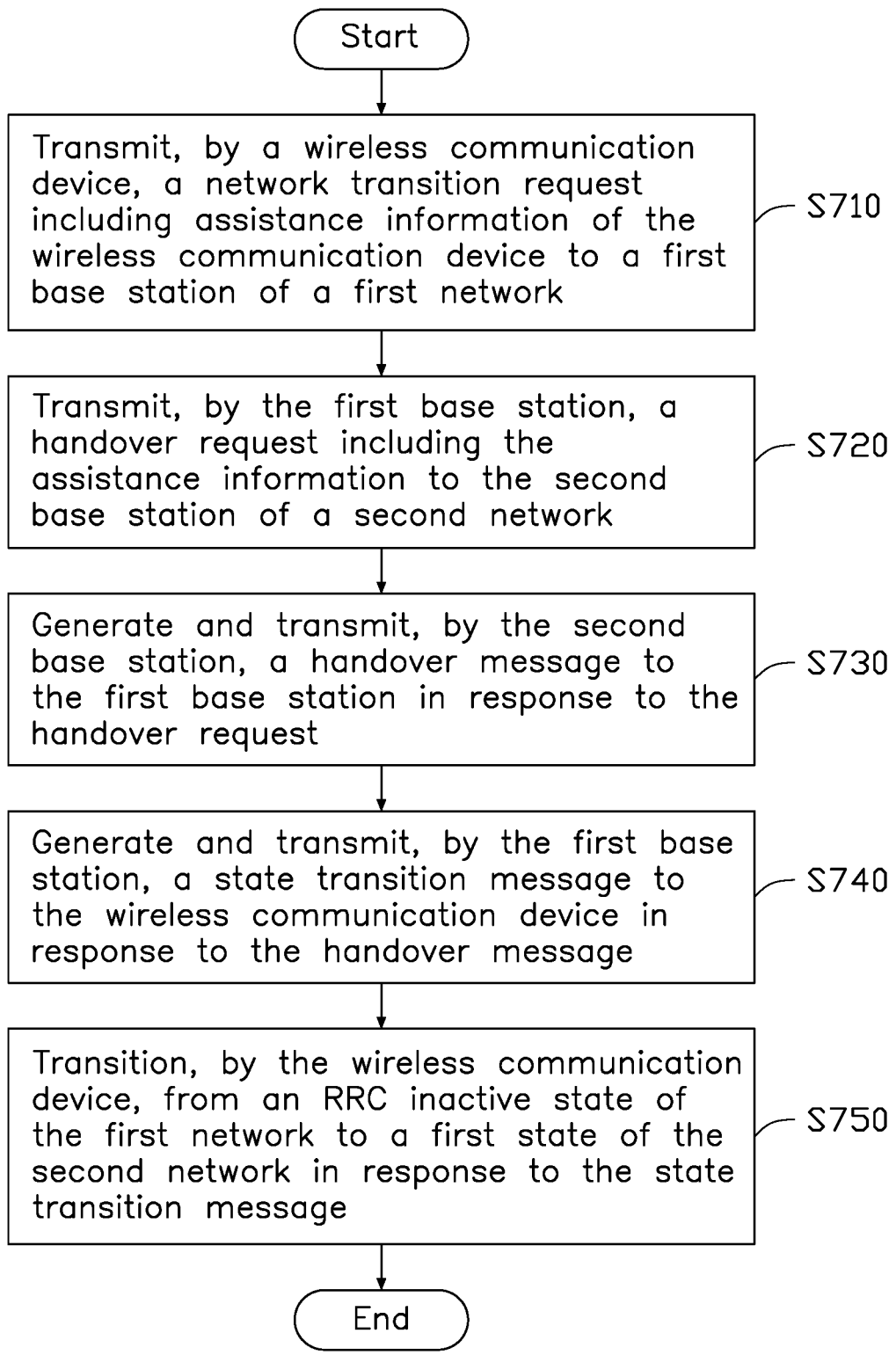
FIG. 7 is a flowchart of a state transition method of a wireless communication system, according to an exemplary embodiment of the present disclosure.

FIG. 7 shows a flow chart of a state transition method of a wireless communication system 300 of FIG. 3, in accordance with an exemplary embodiment of the present disclosure. In step S710, a network transition request is transmitted by a wireless electronic device (e.g., UE 302) to a first base station of a first network (e.g., gNB 304). The network transition request includes assistance information of the wireless communication device. In one exemplary embodiment, the assistance information include a target base station. In another exemplary embodiment, the assistance information include a service type of the wireless communication device. In some exemplary embodiments, the assistance information include a preferred RRC state. In some other exemplary embodiments, the assistance information include a purpose of an RRC connection. In some other exemplary embodiments, the assistance information include an UE's category.

In step S720, a handover request including the assistance information is transmitted by the first base station (e.g., gNB 304) to a second base station of a second network (e.g., eNB 308). In step S730, a handover message is generated and transmitted by the second base station (e.g., eNB 308) to the first base station (e.g., gNB 304) in response to the handover request. In step S740, a state transition message is generated and transmitted by the first base station (e.g., gNB 304) to the wireless communication device (e.g., UE 302) in response to the handover message. In step S750, the wireless communication device (e.g., UE 302) transitions from an RRC inactive state of the first network to a first state of the second network in response to the state transition message.

Figure 8:
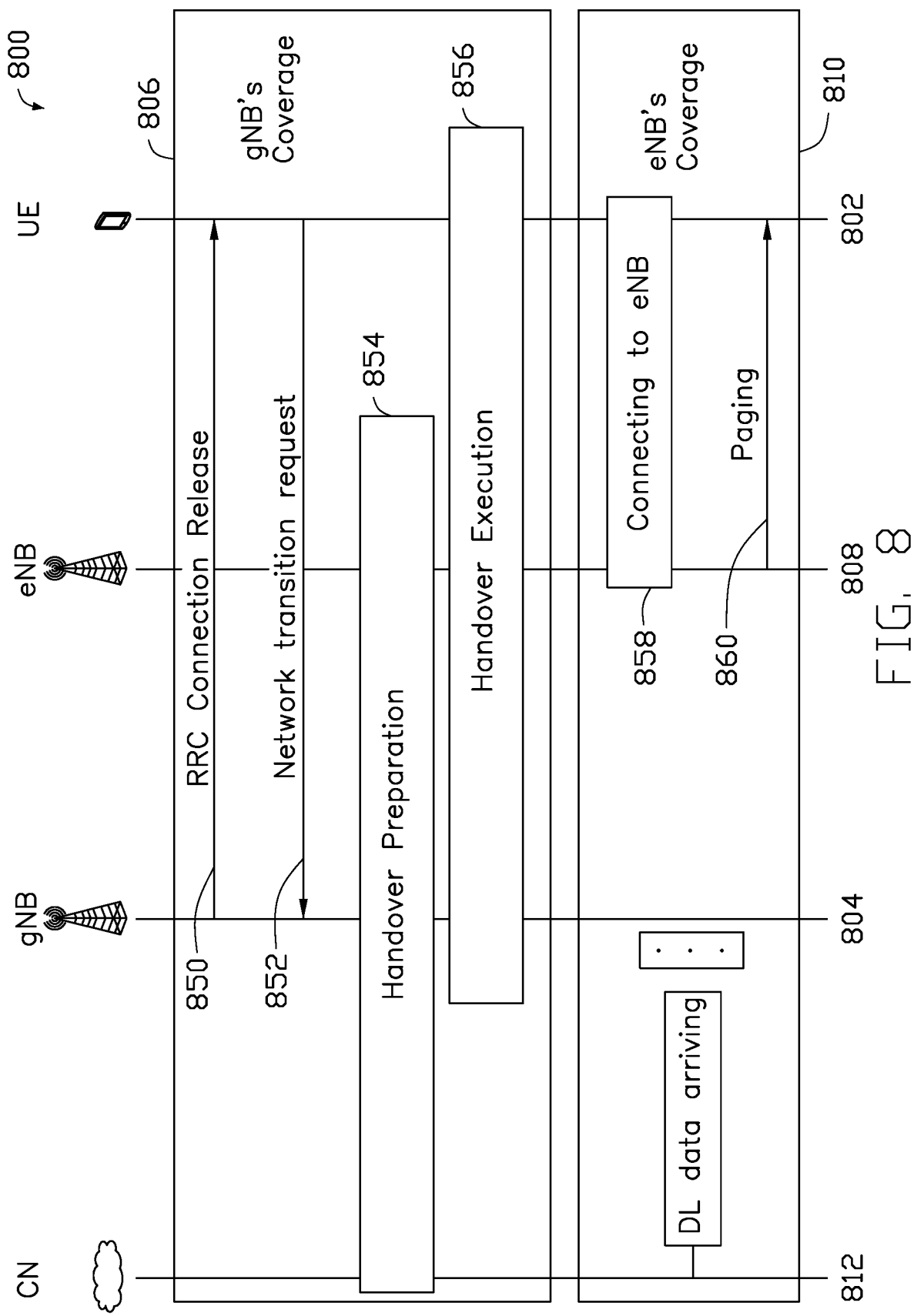
FIG. 8 is a full RRC configuration handover based state transition diagram, according to an exemplary embodiment of the present disclosure.

In FIG. 8, a full RRC configuration handover based state transition diagram 800 shows UE transitions from an RRC INACTIVE state supported by a NR to an RRC IDLE state supported by a 4G wireless network through an RRC CONNECTED state supported by the 4G wireless network. In one exemplary embodiment, the full RRC configuration handover based state transition diagram 800 describes RRC state transition procedures f and h in FIG. 4, where the RRC INACTIVE state 486 under the gNB coverage area 406 transitions to the RRC CONNECTED state 492 under the eNB coverage area 410, then to the RRC IDLE state 494 under the eNB coverage area 410.

As shown in FIG. 8, the full RRC configuration handover based state transition diagram 800 includes steps 850, 852, 854, 856, 858, and 860. In the full RRC configuration handover based state transition diagram 800, the RRC connection setup is performed using a serving gNB 804 to negotiate with a target eNB 808 on behalf of UE 802. For example, an RRC connection resume, transmitted by the UE 802 to the serving gNB 804, contains assistance information including, a target base station (e.g., a cell ID of the target eNB 808), the purpose of the RRC connection (e.g., for transitioning to the RRC IDLE state or to the RRC CONNECTION state), the service type of the UE 802 (e.g., frequent/infrequent small data transmission), and/or the UE 802's category (e.g., the UE's radio capability, data rate and power class). Based upon the assistance information contained in the network transition request from the UE 802, the serving gNB 804 negotiates with the target eNB 708 on behalf of the UE 802 for the purpose of transitioning the UE 802 to the proper RRC state under the eNB coverage area 810. The target eNB 808 may determine the kind of message it replies to the serving gNB 804. The UE 802 may transition either to the RRC CONNECTED state or the RRC IDLE state under the eNB coverage area 810 of the target eNB 808 based upon the decision of the target eNB 808.

In step 850, the UE 802 in a gNB coverage area 806 is suspended to the RRC INACTIVE state by the serving gNB 804 through an RRC Connection Release message, which contains a resume ID. In step 852, the UE 802 sends a network transition request to the serving gNB 804. In this exemplary embodiment, the network transition request is an RRC Connection Resume message with the resume ID or an RRC Connection Request message, and the RRC Connection Resume message with the resume ID or an RRC Connection Request message is transmitted to the serving gNB 804 to request the establishment of an RRC connection. The RRC Connection Resume or RRC Connection Request message contains assistance information of the UE 802. The assistance information may include information to let the target eNB 808 know, through the serving gNB 804, the purpose of the RRC connection (e.g., for transitioning to the RRC IDLE state or to the RRC CONNECTION state) and/or the service type of the UE 802 (e.g., for frequent small data transmission).

In step 854, the serving gNB 804 negotiates with the target eNB 808, with which the UE 802 expects to connect, for a handover preparation. The HO preparation messages exchanged during step 854 are substantially similar to the 4G LTE handover procedures. For example, the serving gNB 804 transmit a handover request including the assistance information received from the UE 802 to the target eNB 808 and to a core network (CN) 812.

In step 856, the target eNB 804 performs a handover execution. For example, after the handover request is received from the serving gNB 804, the target eNB 808 decides an RRC state (RRC CONNECTED or RRC IDLE) for the UE 802 to transition to, and replies a handover message (either an HO request acknowledgement or an HO request rejection) to the serving gNB 804 in response to the handover request. After the handover message is received from the target eNB 808, the serving gNB 804 transmit a state transition message (e.g., an RRC Connection Reconfiguration message or an RRC Connection Release message) to the UE 802 in response to the handover message.

In one exemplary embodiment, the target eNB 608 sends the HO request acknowledgement to the serving gNB 804. The serving gNB 804 sends an RRC Connection Reconfiguration message to the UE 802, to execute the handover (e.g., to transition the UE 802 from the RRC INACTIVE state under the gNB coverage area 806 to the RRC CONNECTED state under the eNB coverage area 810). Alternatively, the target eNB 708 sends an HO request rejection to the serving gNB 704. The serving gNB 804 sends an RRC Connection Release message to the UE 802, to command the release of the RRC connection (e.g., to transition the UE 802 from the RRC INACTIVE state under the gNB coverage area 806 to the RRC IDLE state under the eNB coverage area 810).

It should be noted that the target eNB 808 may include a Light Connection indication may be included in the HO request acknowledgement or the HO request rejection to the serving gNB 804. The serving gNB 804 may forward the Light Connection indication in its subsequent message to the UE 802 in step 856, to configure the UE 802 to transition to a Light Connection operation mode, which may be a sub-state under either the RRC IDLE or RRC CONNECTED state under the eNB coverage area 810. The Light Connection indication may be included in the RRC Connection Reconfiguration message or the RRC Connection Release message from the serving gNB 804 to the UE 802 to transition the UE 802 to the Light Connection operation mode in the RRC CONNECTED state or the RRC IDLE state, respectively. The technical features, functionalities and advantages of the UE 802 in the Light Connection operation mode in either the RRC CONNECTED or RRC IDLE state may be substantially similar to those described with respect to the UE 602 as described above.

In one exemplary embodiment, the assistance information of the UE 802 contained in the network transition request (e.g., the RRC Connection Resume or RRC Connection Request message in step 852) may contain a purpose of the RRC connection and a service type of the UE 802. The target eNB 808 determines whether to transition the UE 802 from the RRC INACTIVE state under the gNB coverage area 806 to either the RRC IDLE state or the RRC CONNECTED state under the eNB coverage area 810, based upon at least one of the purpose of the RRC connection and the service type of the UE 802.

For example, in step 856, the target eNB 808 replies the HO request acknowledgement to the serving gNB 804, which sends the RRC Connection Reconfiguration message to the UE 802, to execute the handover (e.g., to transition the UE 802 from the RRC INACTIVE state under the gNB coverage area 806 to the RRC CONNECTED state under the eNB coverage area 810), if the assistance information indicates that the service type of the UE 802 is for frequent small data transmission. Alternatively, the target eNB 808 sends the HO request rejection to the serving gNB 804, which releases the UE 802 directly (e.g., transitioning the UE 802 from the RRC INACTIVE state under the gNB coverage area 806 to the RRC IDLE state under the eNB coverage area 810), if the assistance information indicates that the service type of the UE 802 is for infrequent small data transmission.

In another exemplary embodiment, the assistance information of the UE 802 contained in the network transition request (e.g., the RRC Connection Resume or RRC Connection Request message in step 852) may contain a preferred RRC state from the UE 802. The target eNB 808 may determine whether to transition the UE 802 from the RRC INACTIVE state to either the RRC IDLE state or the RRC CONNECTED state based upon of the preferred RRC state from the UE 802 (e.g., honoring the preferred RRC state).

For example, the target eNB 808 sends the HO request acknowledgement to the serving gNB 804, which sends an RRC Connection Reconfiguration message to the UE 802, to execute the handover (e.g., to transition the UE 802 from the RRC INACTIVE state under the gNB coverage area 806 to the RRC CONNECTED state under the eNB coverage area 810), when the assistance information of the UE 802 indicates the preferred RRC state is the RRC CONNECTED state. Alternatively, the target eNB 808 sends the HO request rejection to the serving gNB 804, which releases the UE 802 directly (e.g., transitioning the UE 802 from the RRC INACTIVE state under the gNB coverage area 806 to the RRC IDLE state under the eNB coverage area 810), when the assistance information of the UE 802 indicates the preferred RRC state is the RRC IDLE state.

In yet another exemplary embodiment, the assistance information of the UE 802 may include the UE 802's radio capability, data rate and power class. The target eNB 808 determines whether to transition the UE 802 from the RRC INACTIVE state under the gNB coverage area 806 to either the RRC IDLE state or the RRC CONNECTED state under the eNB coverage area 810 based upon at least one of the UE 802's category, such as the UE 802's radio capability, data rate and power class.

In step 858, when receiving the RRC Connection Reconfiguration message from the serving gNB 804, the UE 802 may synchronize with the target eNB 808 to establish a connection with the target eNB 808.

In step 860, the CN 812 may configure the proper paging configurations with the target eNB 808. When any downlink data needs to be transmitted to the UE 802, the CN 812 may page the UE 802 by TA-based paging procedures using the target eNB 808 to broadcast the paging message from the CN 812 to the UE 802. In another exemplary embodiment, the CN 812 may configure the proper paging configurations with a plurality of eNBs around the serving gNB 804, including the target eNB 808. When downlink data needs to be transmitted to the UE 802, the CN 812 may page the UE 802 by TA-based paging procedures using all of the plurality of eNBs to broadcast the paging message from the CN 812 to the UE 802.

As described above, several state transition methods are provided. According to the state transition method, if the UE determines that the radio link quality between itself and the serving gNB is getting poor and/or satisfies a predefined condition, the UE starts to prepare an RRC connection setup with the target eNB whose reference signal measurement results are better than the serving gNB and other neighboring eNBs, and send a network transition request to the serving gNB or the target eNB for establishing an RRC connection with eNB. In some exemplary embodiments, the UE may follow handover-likes procedure between the gNB and eNB to setup its RRC connection with eNB. If the UE determines that the radio link quality between itself and the serving gNB is getting poor and/or satisfies a predefined condition, the UE will resume the connection with the serving gNB using the RRC Connection Resume message containing the assistance information, e.g. the cell ID of the target eNB. Hence, based on the RRC Connection Resume message and the assistance information, the serving gNB negotiates with the target eNB to initiate the handover process.

Furthermore, the target eNB determines the target state of the UE in response to the assistance information in the network transition request. After the UE receives the state transition message, the UE transitions to from an RRC INACTIVE state under gNB coverage to the RRC CONNECTED state or the RRC IDLE state under eNB coverage.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A state transition method of a wireless communication system, comprising:
   transmitting, by a wireless communication device, a network transition request to a first base station of a first network when the wireless communication device is operated in an RRC inactive state of the first network, wherein the network transition request includes assistance information comprising a preferred RRC state of the wireless communication device, and the network transition request is an RRC connection resume message; and
   transmitting, by the first base station, a handover request including the assistance information to a second base station of a second network in response to the network transition request;
   generating and transmitting, by the second base station, a handover message to the first base station in response to the handover request;
   generating and transmitting, by the first base station, a state transition message to the wireless communication device in response to the handover message; and
   transitioning, by the wireless communication device, from the RRC inactive state of the first network to a first state of the second network in response to the state transition message;
   wherein the first state is an RRC connected state when the state transition message is an RRC connection setup message, and the first state is an RRC idle state when the state transition message is an RRC connection rejection message.

2. The state transition method of claim 1, wherein the assistance information includes a target base station.

3. The state transition method of claim 1, wherein the assistance information includes a service type of the wireless communication device.

4. A wireless communication system, comprising:
   a first base station connected to a first network
   a second base station connected to a second network; and
   a wireless communication device;
   wherein:
   the wireless communication device is configured to transmit a network transition request to the first base station when the wireless communication device is operated in an RRC inactive state of the first network, wherein the network transition request includes assistance information comprising a preferred RRC state of the wireless communication device, and the network transition request is an RRC connection resume message;
   the first base station is configured to transmit a handover request including the assistance information to the second base station in response to the network transition request;
   the second base station is configured to generate and transmit a handover message to the first base station in response to the handover request;
   the first base station is further configured to generate and transmit a state transition message to the wireless communication device in response to the handover message; and the wireless communication device is further configured to transition from the RRC inactive state of the first network to a first state of the second network in response to the state transition message;
wherein the first state is an RRC connected state when the state transition message is an RRC connection setup message, and the first state is an RRC idle state when the state transition message is an RRC connection rejection message.

5. The wireless communication system of claim 4, wherein the assistance information includes a target base station.

6. The wireless communication system of claim 4, wherein the assistance information includes a service type of the wireless communication device.

7. A wireless communication device, comprising:
a processor configured to:
transmit a network transition request to a first base station of a first network when the wireless communication device is operated in an RRC inactive state of the first network, wherein the network transition request includes assistance information comprising a preferred RRC state of the wireless communication device, and the network transition request is an RRC connection resume message;
receive a state transition message from the first base station, wherein the state transition message is generated by the first base station in response to a handover message received from a second base station of a second network and responding to the network transition request; and
transition from the RRC inactive state of the first network to a first state of a second network;
wherein the first state is an RRC connected state when the state transition message is an RRC connection setup message, and the first state is an RRC idle state when the state transition message is an RRC connection rejection message.

8. The wireless communication device of claim 7, wherein the assistance information includes a target base station.

9. The wireless communication device of claim 7, wherein the assistance information includes a service type of the wireless communication device.

10. A base station connected to a wireless communication device via a first network, comprising:
a processor configured to:
receive a network transition request from the wireless communication device when the wireless communication device is operated in an RRC inactive state of the first network, wherein the network transition request includes assistance information comprising a preferred RRC state of the wireless communication device, and the network transition request is an RRC connection resume message;
transmit a handover request including the assistance information to a second base station of a second network in response to the network transition request;
receive a handover message from the second base station, wherein the handover message is generated by the second base station in response to the handover request; and
generate and transmit a state transition message to the wireless communication device in response to the handover message;
wherein the wireless communication device transitions from the RRC inactive state of the first network to a first state of the second network when the wireless communication device receives the state transition message;
wherein the first state is an RRC connected state when the state transition message is an RRC connection setup message, and the first state is an RRC idle state when the state transition message is an RRC connection rejection message.

11. The base station of claim 10, wherein the assistance information includes a target base station.

12. The base station of claim 10, wherein the assistance information includes a service type of the wireless communication device.

13. The base station of claim 10, wherein the processor is further configured to transmit the handover request including the assistance information comprising the preferred RRC state to the second base station when the wireless communication device is operated in the RRC inactive state of the first network.

* * * * *